US012012911B2

(12) United States Patent
Davis et al.

(10) Patent No.: US 12,012,911 B2
(45) Date of Patent: Jun. 18, 2024

(54) DEFLECTOR PROVIDED WITH FACES WITH DIFFERENT CURVATURES FOR A THRUST REVERSER OF AN AIRCRAFT ENGINE NACELLE

(71) Applicant: AIRBUS OPERATIONS (SAS), Toulouse (FR)

(72) Inventors: Lauren Davis, Toulouse (FR); Christophe Bourdeau, Toulouse (FR); Frédéric Chelin, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 18/129,507

(22) Filed: Mar. 31, 2023

(65) Prior Publication Data

US 2023/0340928 A1  Oct. 26, 2023

(30) Foreign Application Priority Data

Apr. 21, 2022  (FR) .................................... 2203682

(51) Int. Cl.
*F02K 1/72*  (2006.01)
(52) U.S. Cl.
CPC ..................... *F02K 1/72* (2013.01)
(58) Field of Classification Search
CPC .................... F02K 1/64; F02K 1/72
See application file for complete search history.

(56) References Cited

U.S. PATENT DOCUMENTS

| 3,303,653 | A  * | 2/1967 | Hull, Jr. ................. | F02K 1/645 |
| | | | | 60/229 |
| 10,648,426 | B2 * | 5/2020 | Smith .................... | F01D 9/041 |
| 11,566,583 | B2 * | 1/2023 | Chilukuri ................ | F02K 1/56 |
| 11,708,170 | B2 * | 7/2023 | Antraygue ............. | B64D 31/06 |
| | | | | 244/191 |
| 11,708,803 | B2 * | 7/2023 | Davis ....................... | F02K 1/72 |
| | | | | 60/226.2 |
| 2012/0036716 | A1 * | 2/2012 | Urban ...................... | F02K 1/72 |
| | | | | 29/889 |
| 2016/0146156 | A1 * | 5/2016 | Crawford ................ | F02K 1/72 |
| | | | | 239/265.27 |
| 2017/0058828 | A1 | 3/2017 | Dong | |
| 2017/0204809 | A1 * | 7/2017 | Smith .................... | F01D 25/28 |
| 2020/0318574 | A1 * | 10/2020 | Gardes ..................... | F02K 1/72 |
| 2022/0325679 | A1 * | 10/2022 | Chilukuri ............... | F02K 1/625 |

FOREIGN PATENT DOCUMENTS

EP  3 597 543  1/2020

OTHER PUBLICATIONS

Search Report for FR 2203682 dated Nov. 28, 2022, 2 pages.

* cited by examiner

*Primary Examiner* — Anthony Ayala Delgado
(74) *Attorney, Agent, or Firm* — Nixon & Vanderhye P.C.

(57) ABSTRACT

A deflector for an ejection structure of a thrust reverser is disclosed including a deflector plate configured to act on an aerodynamic flow, the deflector plate having a concave upstream face, a convex downstream face, an inlet end, and an outlet end. The upstream face and the downstream face of the deflector plate have different curved profiles, the deflector has a particular profile giving it properties allowing it to act effectively on the aerodynamic flow so as to enhance the performance of the thrust reverser in which it is mounted.

15 Claims, 8 Drawing Sheets

DEFLECTOR PROVIDED WITH FACES WITH DIFFERENT CURVATURES FOR A THRUST REVERSER OF AN AIRCRAFT ENGINE NACELLE

CROSS REFERENCE TO RELATED APPLICATION

This application claims priority to and incorporates by reference the entirety of French Application Number FR 2203682, filed Apr. 21, 2022.

BACKGROUND

The present invention relates to a deflector provided with faces with different curvatures for a thrust reverser of an aircraft engine nacelle, and to a thrust reverser having at least one such deflector.

It is known that the engines of an aircraft, for example a transport airplane, are provided with a thrust reverser the purpose of which is to slow the aircraft during a landing, by producing a reverse-thrust force. The thrust reverser is integrated into the nacelle surrounding the engine, for example a bypass turbojet engine.

In the usual way, a cascade-type thrust reverser generally comprises a cowl able to move, alternately, between a deployed position in which it opens a passageway in the nacelle and uncovers the flow-deflecting and ejection cascades, and a closed position in which it closes this passageway.

When the thrust reverser is deployed and the cowl is moved into its deployed position, doors close off the path for air from the engine so as to deflect part of the flow toward the ejection cascades and thereafter the outside of the nacelle through the ejection cascades, thereby generating a reverse-thrust aerodynamic force.

The ejection cascades are generally formed of cascades of vanes containing a high number of deflectors.

The present disclosure encompasses to have better management of the flows and to improve the performance of this kind of thrust reverser.

SUMMARY

The invention encompasses a deflector for a thrust reverser of a nacelle of an aircraft engine, making it possible to achieve this objective, the deflector comprising a deflector plate intended to act on an aerodynamic flow, the deflector plate having a concave face referred to as upstream face and a convex face referred to as downstream face as well as an end referred to as inlet end and an end referred to as outlet end.

According to an exemplary embodiment, the upstream face and the downstream face of the deflector plate have different curved profiles.

Thus, by virtue of the different curved profiles on the upstream and downstream faces it is possible to provide on these upstream and downstream faces particular profiles that make it possible to confer upon the deflector (which has a substantially crescent shaped overall geometric shape in cross section) particular properties to influence the aerodynamic flow in order in particular to assist in enhancing the performance of a thrust reverser when integrated therein, as specified hereinbelow.

In the context of the exemplary embodiment, the deflector may be:
an orbital deflector; or
a lateral deflector.

Advantageously, the upstream face and the downstream face of the deflector plate each comprise at least one curved intermediate zone, the curvatures of the two intermediate zones being different.

In addition, advantageously, the upstream face and the downstream face of the deflector plate each comprise, at the inlet end, a rectilinear portion having an angle referred to as inlet angle. The two inlet angles have, for example, different values.

Furthermore, advantageously, the upstream face and the downstream face of the deflector plate each comprise, at the outlet end, a rectilinear portion having an angle referred to as outlet angle. The two outlet angles have, for example, different values.

As a result, both on the upstream face and on the downstream face of the deflector, it is possible to alter the various existing zones (curved intermediate zone and rectilinear portions on the inlet and outlet ends) that there are in order to modify the corresponding profile of the deflector in order to give it the desired properties for influencing the aerodynamic flow.

In an exemplary embodiment, the deflector plate is provided, in its body, with a hollow closed internal space.

Furthermore, in one particular embodiment, the deflector plate comprises at least one of the following angle values:
for the upstream face, at the inlet end, an inlet angle of between 5° and 70°;
for the downstream face, at the inlet end, an inlet angle of between 5° and 70°;
for the upstream face, at the outlet end, an outlet angle of between 10° and 60°;
for the downstream face, at the outlet end, an outlet angle of between 10° and 60°.

Moreover, in a first embodiment, at the outlet end, the upstream face and the downstream face of the deflector plate meet along a junction line.

Furthermore, in a second embodiment, at the outlet end, the upstream face and the downstream face of the deflector plate meet on each side an end surface. This end surface may be planar.

The present invention also relates to a thrust reverser for a nacelle of an aircraft engine. According to the invention, the thrust reverser comprises at least one deflector like the one described hereinabove.

Advantageously, the deflector or deflectors are arranged in such a way as to create ejection paths of variable widths.

Furthermore, in one particular embodiment, the thrust reverser comprises a plurality of deflectors having characteristics, for example heights, that vary according to their location.

Moreover, advantageously, the thrust reverser comprises a plurality of deflectors of which at least two are radially offset relative to one another.

The present invention also relates to a nacelle for an engine of an aircraft, particularly a civil transport airplane, which comprises at least one thrust reverser like the one described hereinabove.

BRIEF DESCRIPTION OF THE DRAWINGS

For an understanding of embodiments of the disclosure, reference is now made to the following description taken in conjunction with the accompanying drawings.

DETAILED DESCRIPTION

Figure 1:
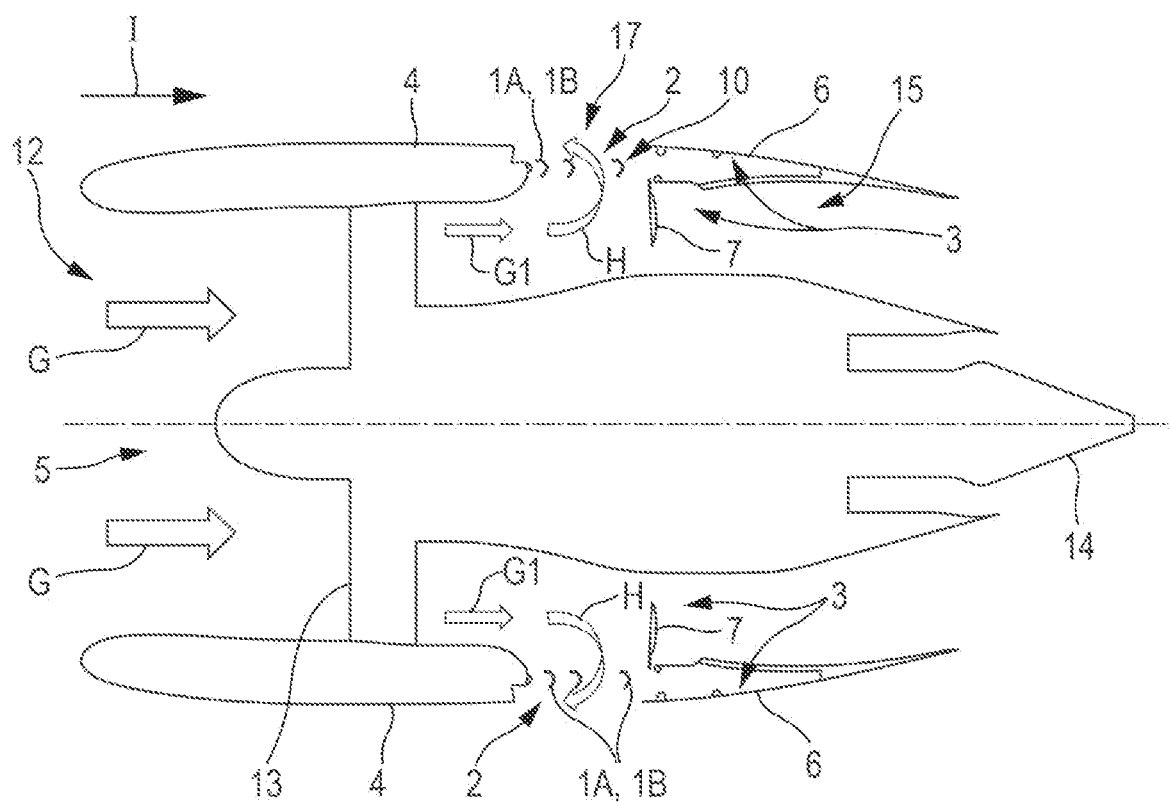
FIG. 1 is a schematic view in section of an aircraft engine nacelle provided with a thrust reverser comprising deflectors according to an exemplary embodiment of the invention.
Figure 2:
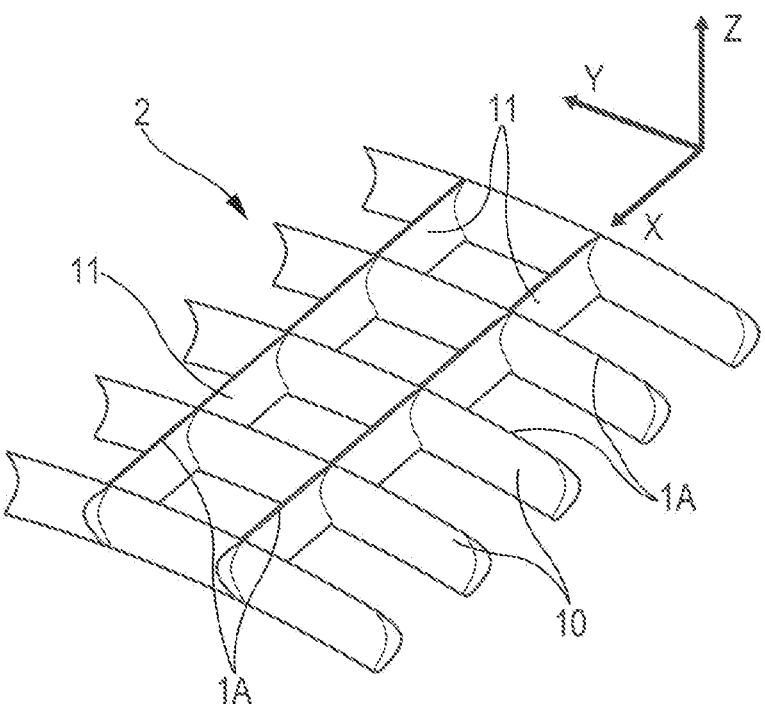
FIG. 2 is a perspective view of part of an ejection structure provided with lateral and orbital deflectors.
Figure 3:
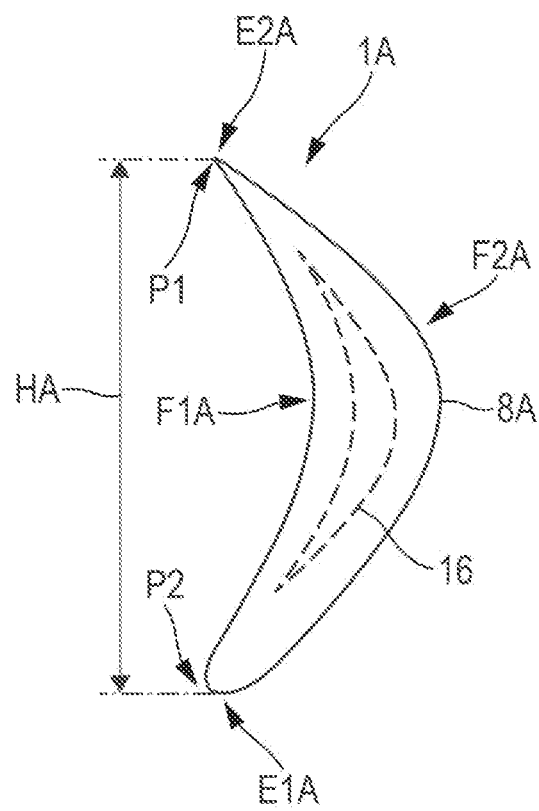
FIG. 3 schematically illustrates a deflector according to an exemplary embodiment of the invention.
Figure 4:
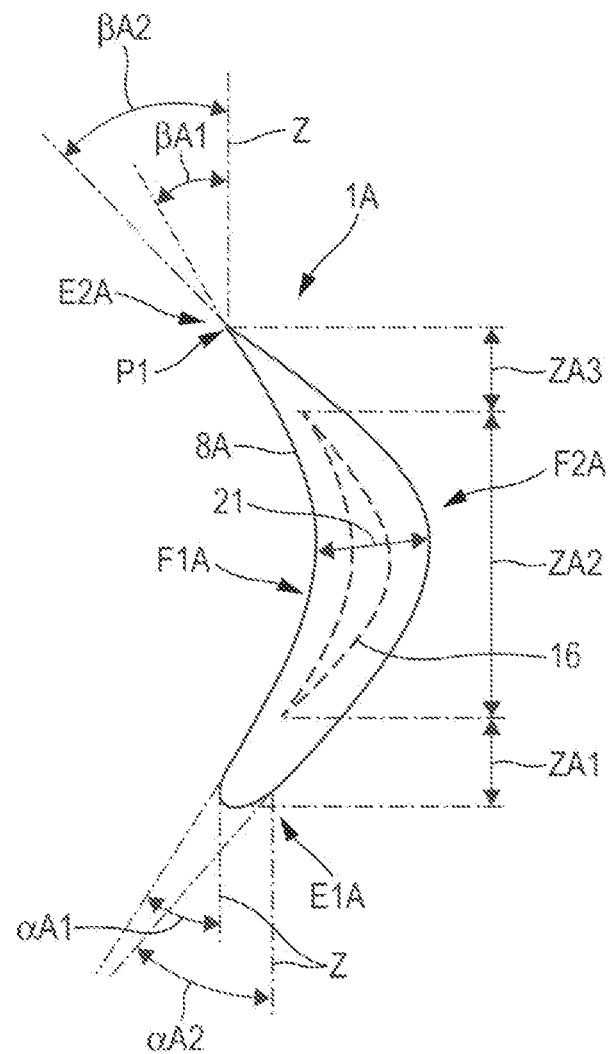
FIG. 4 is a view similar to that of FIG. 3, highlighting various parameters of the deflector.
Figure 5:
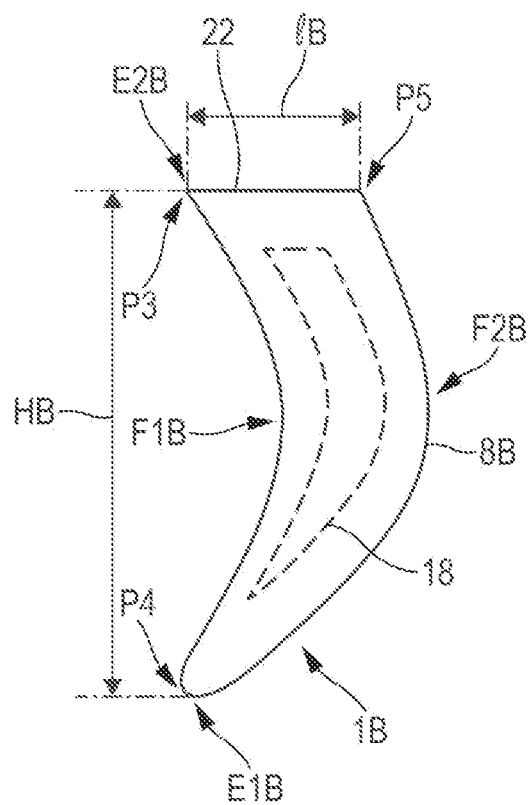
FIG. 5 schematically illustrates a deflector according to an exemplary embodiment of the invention.
Figure 6:
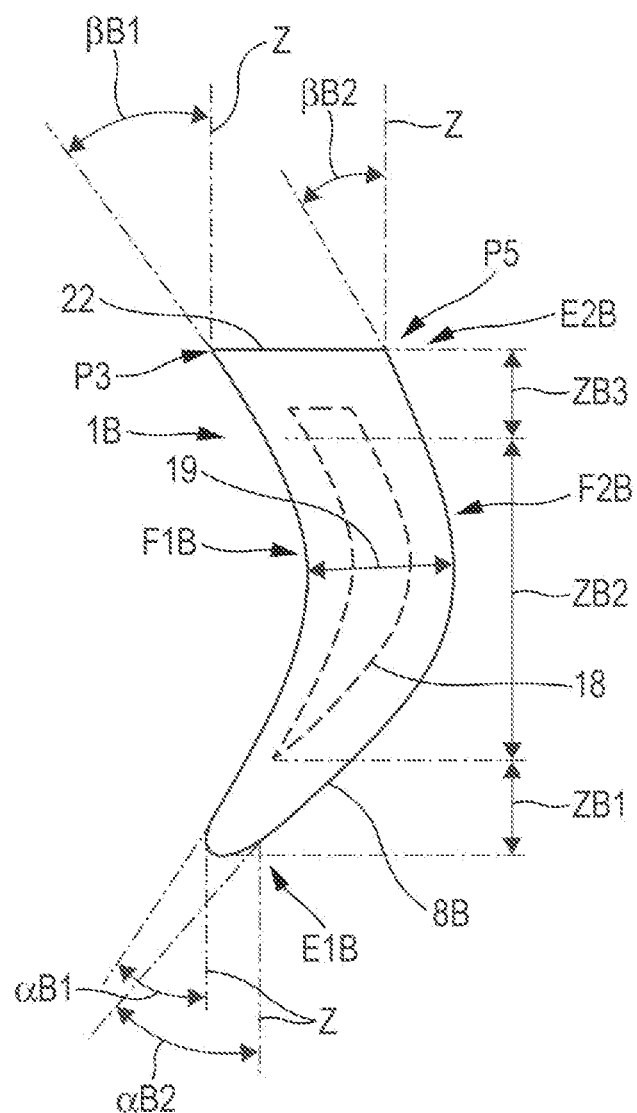
FIG. 6 is a view similar to that of FIG. 5, highlighting various parameters of the deflector.

The deflector schematically depicted in an exemplary embodiment 1A in FIGS. 3 and 4 and in an exemplary embodiment 1B in FIGS. 5 and 6 is intended to be mounted in an ejection (and flow-deflection) structure 2 depicted partially in one particular example in FIG. 2. This ejection structure 2 forms part of a thrust reverser 3, as depicted in FIG. 1. The thrust reverser 3 is fitted to a nacelle 4 of an engine 5, for example a bypass turbojet engine, of an aircraft (not depicted).

In the usual way, a bypass turbojet engine is able, by means of a fan 13, to generate a flow of hot air coming from the combustion chamber of the turbojet engine and a flow of cold air which circulates around the outside of the turbojet engine through an annular duct 15 formed between a cowling of the turbojet engine and an internal wall of the nacelle 4. The two air flows are ejected from the turbojet engine via the rear of the nacelle 4.

In the example of FIG. 1, the engine 5, in this instance a bypass turbojet engine, is surrounded in the usual way by the nacelle 4. The nacelle 4 has a tubular structure comprising in succession, in the direction of an arrow I (from front to rear) in FIG. 1, an air inlet 12 through which an air flow enters as illustrated by arrows G, a section intended to surround the fan 13 of the turbojet engine, and a section housing the thrust reverser 3 and intended to surround the combustion chamber of the turbojet engine, and ends in a jet pipe ejection nozzle 14.

The purpose of the thrust reverser 3 is to improve, when the aircraft equipped with the nacelle 4 and with the engine 5 is coming into land, the braking capacity by redirecting forward (in the opposite direction to that of the arrow I), at least some of the thrust generated by the engine 5.

To do that, the nacelle 4 comprises a cowl 6 which is able to move, for example to slide, and is configured in such a way that in moving back (in the direction of the arrow I), during a phase of opening, it uncovers the ejection structure or structures 2 arranged in the thickness of the nacelle 4 in a zone referred to as ejection zone 17. A mechanical system connects this mobile cowl 6 to blocking panels (or doors) 7 which deploy inside the duct 15 and block the flow G1 (which corresponds to that part of the flow G that is circulating in the duct 15) from leaving at the rear as a direct flow. The flow is thus diverted and ejected through the ejection structure 2, as illustrated by arrows H in FIG. 1, thus creating the reverse thrust.

FIG. 2 depicts, by way of example, part of an ejection structure 2. This ejection structure 2 comprises a plurality of deflectors 10 and 11, namely:

orbital deflectors 10, namely deflectors which are arranged in a direction (illustrated by an arrow Y), normal to that of the engine axis (illustrated by an arrow X) of the engine 5 and have the usual function of deflecting the air flow in order to generate the reverse thrust; and, lateral deflectors 11, namely deflectors which are arranged in the direction of the engine axis illustrated by the arrow X and which act on the flow leaving the thrust reverser to prevent it from reaching certain zones, as specified hereinbelow.

The deflector schematically depicted in the exemplary embodiment 1A in FIGS. 3 and 4 and in the exemplary embodiment 1B in FIGS. 5 and 6 may correspond to an orbital deflector 10 or to a lateral deflector 11, as specified hereinafter.

The deflector 1A, 1B may comprise a deflector plate 8A, 8B. The deflector plate 8A, 8B and the deflector 1A, 1B may be produced according to various embodiments, as specified hereinbelow.

The deflector plate 8A, 8B has a face referred to as upstream face F1A, F1B which is concave and a face referred to as downstream face F2A, F2B which is convex. The upstream face F1A, F1B is situated upstream and the downstream face F2A, F2B is situated downstream, relative to the direction in which the flow G1 flows.

The deflector plate 8A, 8B also has an end referred to as inlet end E1A, E1B via which the flow H arrives at the deflector plate 8A, 8B and an end referred to as outlet end E2A, E2B at which the flow H leaves the deflector 1A, 1B and exits the ejection structure 2.

According to an exemplary embodiment, the deflector plate 8A, 8B of the deflector 1A, 1B has a more or less crescent shaped overall geometric shape (in cross section), as specified hereinbelow, in which the upstream face (concave face) F1A, F1B and the downstream face (convex face) F2A, F2B of the deflector plate 8A, 8B have different curved profiles, as described hereinafter with reference to two embodiments 1A and 1B.

In the first embodiment, depicted in FIGS. 3 and 4, which relates to the deflector 1A, the deflector plate 8A has, between the inlet end E1A and the outlet end E2A, three successive zones as depicted in FIG. 4:

an inlet zone ZA1 which corresponds to a portion that is rectilinear, in cross section, both on the upstream face F1A and on the downstream face F2A;

an intermediate zone ZA2 which corresponds, in cross section, to a portion that is curved both on the upstream face F1A and on the downstream face F2A, the curved portions having different curvatures between the upstream face F1A and the downstream face F2A; and, an outlet zone ZA3 corresponding to a portion that is rectilinear, in cross section, both on the upstream face F1A and on the downstream face F2A.

The curved portion of the intermediate zone ZA2 may have a variable curvature, both on the upstream face F1A and on the downstream face F2A. These curvatures are adapted and optimized in order to obtain a deflector 1A that best meets the desired objectives, namely mainly in terms of its effect on the flow. By modifying the curvatures, it is therefore possible to modify the profile of each of the upstream and downstream faces and thus the overall profile of the deflector 1A, the overall profile of the deflector 1A being an important parameter in adapting the effect of the deflector 1A on the flow.

Referring to FIGS. 3 and 4, the profile of the upstream face F1A of the deflector 1A is formed of the rectilinear portion of the inlet zone ZA1, of the curved portion of the intermediate zone ZA2 and of the rectilinear portion of the outlet zone ZA3. As a result, in order to modify the profile of the upstream face F1A of the deflector 1A, the characteristics of one or more of these zones ZA1, ZA2 and ZA3 on the upstream face F1A are modified.

Likewise, the profile of the downstream face F2A of the deflector 1A is formed of the rectilinear portion of the inlet zone ZA1, of the curved portion of the intermediate zone ZA2 and of the rectilinear portion of the outlet zone ZA3. As a result, in order to modify the profile of the downstream face F2A of the deflector 1A, the characteristics of one or more of these zones ZA1, ZA2 and ZA3 on the downstream face F2A are modified.

Moreover, as depicted in FIGS. 3 and 4, at the outlet end E2A, the rectilinear line of the upstream face F1A and the rectilinear line of the downstream face F2A of the deflector plate 8A meet along a junction line illustrated by the point P1 in cross section.

Furthermore, at the inlet end E1A, the upstream face F1A and the downstream face F2A of the deflector plate 8A meet along a junction line illustrated by the point P2 in cross section. The inlet end E1A has a rounded shape.

The deflector plate 8A includes, at the inlet end E1A, on the upstream face F1A, an inlet angle $\alpha A1$ (FIG. 4) of between 5° and 70°. This inlet angle $\alpha A1$ corresponds to the angle between the rectilinear portion of the inlet zone ZA1 on the upstream face F1A and a vertical direction (corresponding to the direction Z in FIG. 2). The vertical direction Z passing substantially between the furthest upstream point P2 of the inlet end E1A and the furthest upstream point P1 of the outlet end E2A of the deflector plate 8A.

In addition, the deflector plate 8A also includes, at the inlet end E1A, on the downstream face F2A, an inlet angle $\alpha A2$ (FIG. 4) of between 5° and 70°. This inlet angle $\alpha A2$ corresponds to the angle between the rectilinear portion of the inlet zone ZA1 on the downstream face F2A and the vertical direction Z.

The two inlet angles $\alpha A1$ and $\alpha A2$ have different values. In one particular embodiment, the two inlet angles $\alpha A1$ and $\alpha A2$ may equally have identical values (because of the rounded shape of the inlet end E1A).

Furthermore, the deflector plate 8A includes, at the outlet end E2A, on the upstream face F1A, an outlet angle $\beta A1$ (FIG. 4) of between 10° and 60°. This outlet angle $\beta A1$ corresponds to the angle between the rectilinear portion of the outlet zone ZA3 on the upstream face F1A and the vertical direction Z.

In addition, the deflector plate 8A has at the outlet end E2A on the downstream face F2A an outlet angle $\beta A2$ (FIG. 4) of between 10° and 60°. This outlet angle $\beta A2$ corresponds to the angle between the rectilinear portion of the outlet zone ZA3 on the downstream face F2A and the vertical direction Z.

The two outlet angles $\beta A1$ and $\beta A2$ have different values. The inlet angles $\alpha A1$ and $\alpha A2$ and the outlet angles $\beta A1$ and $\beta A2$ may have values greater than those of the usual deflectors of the ejection vanes of usual cascade-type reversers, thereby making it possible to increase the reverse-thrust angular effect.

In an exemplary embodiment:
the inlet zone ZA1 of the deflector plate 8A may correspond to a portion that is curved, in cross section, and this being the one on the upstream face F1A and/or on the downstream face F2A; and/or
the outlet zone ZA3 of the deflector plate 8A may correspond to a portion that is curved, in cross section, this being the one on the upstream face F1A and/or on the downstream face F2A.

The maximum thickness 21 (FIG. 4) of the deflector plate 8A may be less than 40% of the height HA (FIG. 3) of the deflector plate 8A. The height HA corresponds to the length, in the vertical direction Z, of the deflector plate 8A, namely substantially to the length between the furthest upstream point P2 of the inlet end E1A and the furthest upstream point P1 of the outlet end E2A of the deflector plate 8A.

The inlet angles $\alpha A1$ and $\alpha A2$, the outlet angles $\beta A1$ and $\beta A2$ as well as the curvatures and lengths of the intermediate zone ZA2, both on the upstream face FA1 and on the downstream face F2A are parameters that can vary according to the embodiments envisioned and their values are selected in particular in order to optimize performance Thus, by adapting these parameters, it is possible to optimize the profile of each of the upstream and downstream faces and thus optimize the overall profile of the deflector 1A in order to obtain the desired effects on the flow.

In an exemplary embodiment, the deflector plate 8A is provided, in its body, with an internal space 16 depicted in dashed line in FIGS. 3 and 4. This internal space 16 is hollow and closed. In cross section, the internal space 16 may, for example, have a shape (at a reduced size) similar to that of the external outline of the deflector plate 8A. This exemplary embodiment makes it possible to reduce the mass of the deflector 1A.

Furthermore, in the second embodiment, depicted in FIGS. 5 and 6, which relates to the deflector 1B, the deflector plate 8B has, between the outlet end E1B and the outlet end E2B, three successive zones as depicted in FIG. 6:
an inlet zone ZB1 corresponding to a portion that is rectilinear, in cross section, both on the upstream face F1B and on the downstream face F2B;
an intermediate zone ZB2 corresponding, in cross section, to a portion that is curved both on the upstream face F1B and on the downstream face F2B, the curved portions having different curvatures between the upstream face F1B and the downstream face F2B; and
an outlet zone ZB3 corresponding to a portion that is rectilinear, in cross section, both on the upstream face F1B and on the downstream face F2B.

The curved portion of the intermediate zone ZB2 may have a variable curvature, both on the upstream face F1B and on the downstream face F2B. These curvatures are adapted and optimized so as to obtain a deflector 1B that best meets the desired objectives, namely mainly in terms of its effect on the flow. By modifying the curvatures, it is therefore possible to modify the profile of each of the upstream and downstream faces and thus the overall profile of the deflector 1B, the overall profile of the deflector 1B being an important parameter in adapting the effect of the deflector 1B on the flow.

Referring to FIGS. 5 and 6, the profile of the upstream face F1B of the deflector 1B is formed of the rectilinear portion of the inlet zone ZB1, of the curved portion of the intermediate zone ZB2 and of the rectilinear portion of the outlet zone ZB3. As a result, in order to modify the profile of the upstream face F1B of the deflector 1B, the characteristics of one or more of these zones ZB1, ZB2 and ZB3 on the upstream face F1B are modified.

Likewise, the profile of the downstream face F2B of the deflector 1B is formed of the rectilinear portion of the inlet zone ZB1, of the curved portion of the intermediate zone ZB2 and of the rectilinear portion of the outlet zone ZB3. As a result, in order to modify the profile of the downstream face F2B of the deflector 1B, the characteristics of one or more of these zones ZB1, ZB2 and ZB3 on the downstream face F2B are modified.

Moreover, as depicted in FIGS. 5 and 6, at the outlet end E2B, the upstream face F1B and the downstream face F2B of the deflector plate 8B meet on each side an end surface 22, at connecting lines illustrated respectively by the points P3 and P5 in cross section.

This end surface 22 may be situated at the outlet end E2B of the deflector 1B is planar. Furthermore, at the inlet end E1B, the upstream face F1B and the downstream face F2B of the deflector plate 8B meet along a junction line illustrated by the point P4 in cross section. The inlet end E1B has a rounded shape.

The deflector plate 8B has, at the inlet end E1B, on the upstream face F1B, an inlet angle $\alpha B1$ (FIG. 6) of between 5° and 70°. This inlet angle $\alpha B1$ corresponds to the angle between the rectilinear portion of the inlet zone ZB1 on the upstream face F1B and a vertical direction (corresponding to the direction Z in FIG. 2). The vertical direction Z passing substantially between the furthest upstream point P4 of the inlet end E1B and the furthest upstream point P3 of the outlet end E2B of the deflector plate 8B.

In addition, the deflector plate 8B also has, at the inlet end E1B on the downstream face F2B, an inlet angle $\alpha B2$ (FIG. 6) of between 5° and 70°. This inlet angle $\alpha B2$ corresponds to the angle between the rectilinear portion of the inlet zone ZB1 on the downstream face F2B and the vertical direction Z.

The two inlet angles $\alpha B1$ and $\alpha B2$ have different values. In one particular embodiment, the two inlet angles $\alpha B1$ and $\alpha B2$ may equally have identical values (because of the rounded shape of the inlet end E1B).

Furthermore, the deflector plate 8B has at the outlet end E2B, on the upstream face F1B, an outlet angle $\beta B1$ (FIG. 6) of between 10° and 60°. This outlet angle $\beta B1$ corresponds to the angle between the rectilinear portion of the outlet zone ZB3 on the upstream face F1B and the vertical direction Z.

In addition, the deflector plate 8B has at the outlet end E2B, on the downstream face F2B, an outlet angle $\beta B2$ (FIG. 6) of between 10° and 60°. This outlet angle $\beta B2$ corresponds to the angle between the rectilinear portion of the outlet zone ZB3 on the downstream face F2B and the vertical direction Z.

The two outlet angles $\beta B1$ and $\beta B2$ have different values. In one particular embodiment, the two outlet angles $\beta B1$ and $\beta B2$ may equally have identical values. The inlet angles $\alpha B1$ and $\alpha B2$ and the outlet angles $\beta B1$ and $\beta B2$ may have values that are higher than those of the usual deflectors of the ejection vanes of usual cascade type reversers, making it possible to increase the reverse-thrust angular effect.

In an exemplary embodiment:
the inlet zone ZB1 of the deflector plate 8B may correspond to a portion that is curved, in cross section, this being on the upstream face F1B and/or on the downstream face F2B; and/or
the outlet zone ZB3 of the deflector plate 8B may correspond to a portion that is curved, in cross section, this being on the upstream face F1B and/or on the downstream face F2B.

The maximum thickness 19 (FIG. 6) of the deflector plate 8B may be less than 40% of the height HB (FIG. 5) of the deflector plate 8B. The height HB corresponds to the length, along the vertical axis Z, of the deflector plate 8A, namely substantially to the length between the furthest upstream point P4 of the inlet end E1B and the furthest upstream point P3 of the outlet end E2B of the deflector plate 8B.

The inlet angles $\alpha B1$ and $\alpha B2$ and the outlet angles $\beta B1$ and $\beta B2$ as well as the curvatures and lengths of the intermediate zone ZB2, both on the upstream face F1B and on the downstream face F2B, are parameters that can vary according to the embodiments envisioned and their values are selected in particular in order to optimize performance Thus, by adapting these parameters, it is possible to optimize the profile of each of the upstream and downstream faces and thus optimize the overall profile of the deflector 1B in order to obtain the desired effects on the flow.

In an exemplary embodiment, the deflector plate 8B is provided, in its body, with an internal space 18 depicted in dashed line in FIGS. 5 and 6. This internal space 18 is hollow and closed. In cross section, the internal space 18 may, for example, have a shape (reduced in size) similar to that of the external contour of the deflector plate 8B. This exemplary embodiment makes it possible to reduce the mass of the deflector 1B.

The deflectors 1A, 1B as described hereinabove can be used as orbital deflectors 10 and/or as lateral deflectors 11 (FIG. 2). Therefore, depending on the envisioned application, the ejection structure 2 may comprise:
deflectors 1A, 1B solely as orbital deflectors 10, the lateral deflectors in this case corresponding to usual deflectors;
deflectors 1A, 1B only as lateral deflectors 11, the orbital deflectors in this case corresponding to usual deflectors; or
deflectors 1A, 1B both as orbital deflectors 10 and as lateral deflectors 11.

A number of embodiments of ejection structures 2 comprising one or more deflectors 1A, 1B, at least as orbital deflectors 10, are set out hereinbelow. The orbital deflectors 10 may be arranged in the ejection structure 2 in various ways.

The various characteristics of the orbital deflectors 10 used in the ejection structure 2, particularly the number thereof, the way in which they are embodied, and the size and arrangement thereof, are dependent on the properties and characteristics envisioned for the ejection structure 2 and therefore for the thrust reverser 3, as specified hereinbelow with reference to various exemplary embodiments.

The number of orbital deflectors 10 of the ejection structure 2, for example between 1 and 6 orbital deflectors 10, is very much smaller than the number of orbital deflectors usually employed in the ejection vanes of usual cascade-type reversers, thereby in particular making it possible to reduce the bulk and mass.

Figure 7:
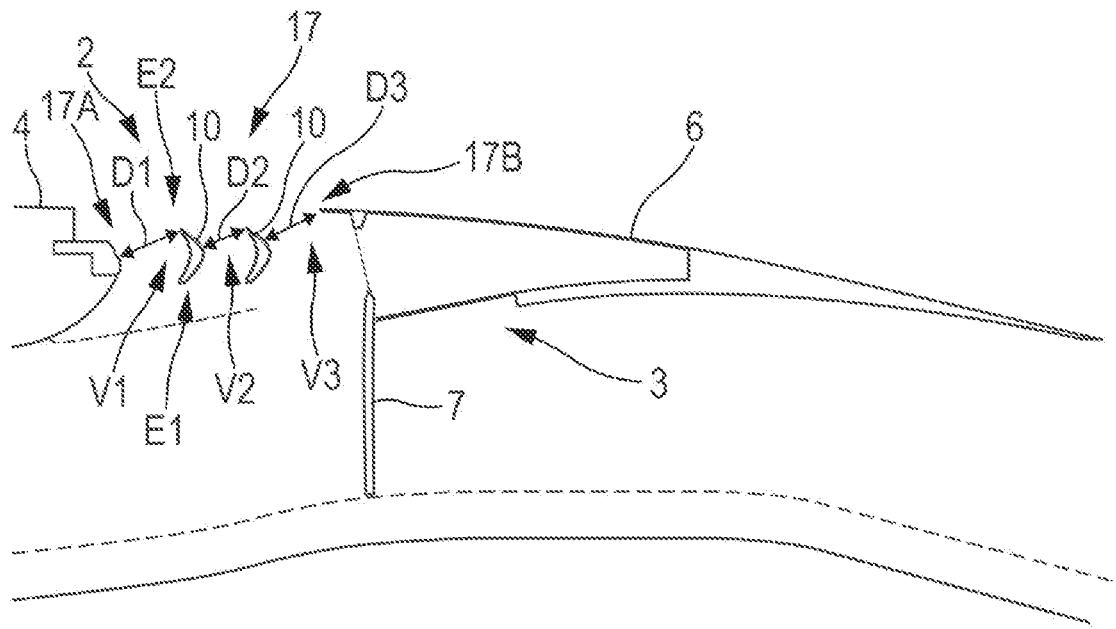
FIG. 7 is a schematic view in longitudinal section of part of a nacelle, in the region of an ejection structure, according to an exemplary embodiment.

In an exemplary embodiment, depicted in FIG. 7, the ejection structure 2 comprises two orbital deflectors 10. These two orbital deflectors 10 are arranged one behind the other, from upstream to downstream, so as to create ejection paths V1, V2 and V3. These ejection paths V1, V2 and V3 have longitudinal distances D1, D2 and D3 at the outlet end E2 of the ejection structure 2, namely:

the distance D1 between the upstream end 17A of the ejection zone 17 and the furthest upstream orbital deflector 10;

the distance D2 between the two orbital deflectors 10; and the distance D3 between the furthest downstream orbital deflector 10 and the downstream end 17B of the ejection zone 17.

The distances D1, D2 and D3 are different in this first embodiment and are selected in such a way as to optimize the ejection of the flow through the ejection paths V1, V2 and V3 and obtain the desired properties for the thrust reverser 3 in particular as regards ejection.

In an exemplary, it is equally conceivable for some of the distances D1, D2 and D3 or all of the distances D1, D2 and D3 to be equal. Setting the distances D1 to D3 is an important parameter in modifying the performance of the ejection structure 2 and thus of the thrust reverser 3. In particular, as the flow G1 (FIG. 1) arriving at the thrust reverser 3 is not uniform, the separation of the orbital deflectors 10 and therefore the distances D1 to D3 can in particular be adapted in order to optimize the flow H that passes through the ejection structure 2.

Figure 8:
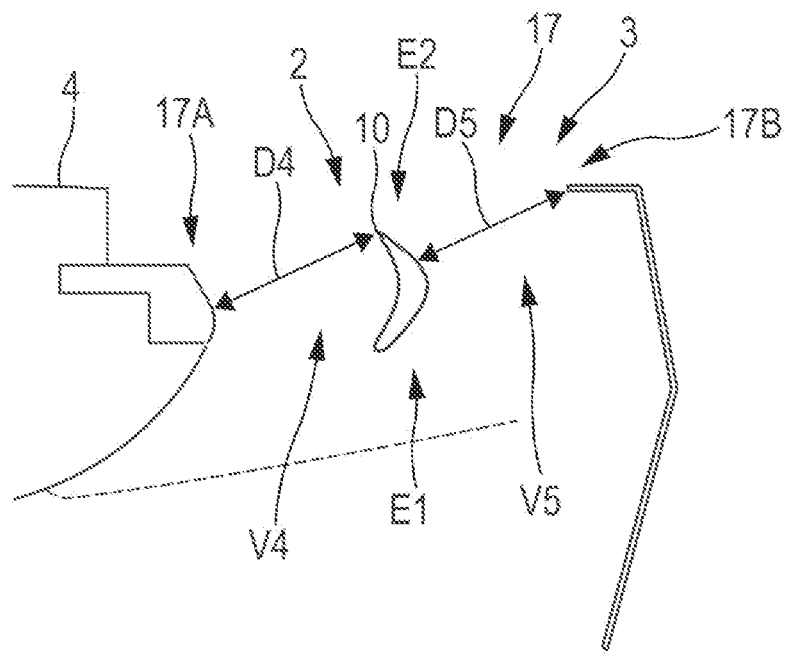
FIG. 8 is a schematic view in longitudinal section of part of a nacelle, in the region of an ejection structure, according to an exemplary embodiment.

Referring to FIG. 8, the ejection structure 2 comprises a single orbital deflector 10. This orbital deflector 10 is arranged in the ejection zone 17 in such a way as to create two ejection paths V4 and V5. These two ejection paths V4 and V5 have longitudinal distances D4 and D5 at the outlet end E2 of the ejection structure 2, namely:

the distance D4 between the upstream end 17A of the ejection zone 17 and the orbital deflector 10; and the distance D5 between the orbital deflector 10 and the downstream end 17B of the ejection zone 17.

The distances D4 and D5 are different and chosen in such a way as to optimize the ejection of the flow through the ejection paths V4 and V5 and obtain the desired properties for the thrust reverser 3 particularly as regards ejection. The distance D5 may be shorter than the distance D4. In an embodiment variant, it is also conceivable for the distances D4 and D5 to be equal or for the distance D5 to be longer than the distance D4. The distances D4 and D5 are adapted according to the flow in the ejection paths V4 and V5.

By virtue of the characteristics of the deflector 1A, 1B used, a single orbital deflector 10, optimized in particular in terms of profile and in terms of outlet cross section, may be sufficient for the operation of the thrust reverser, particularly in the case of a UHBR (Ultra High Bypass Ratio) engine 5 which notably has reduced fan speeds.

Figure 9:
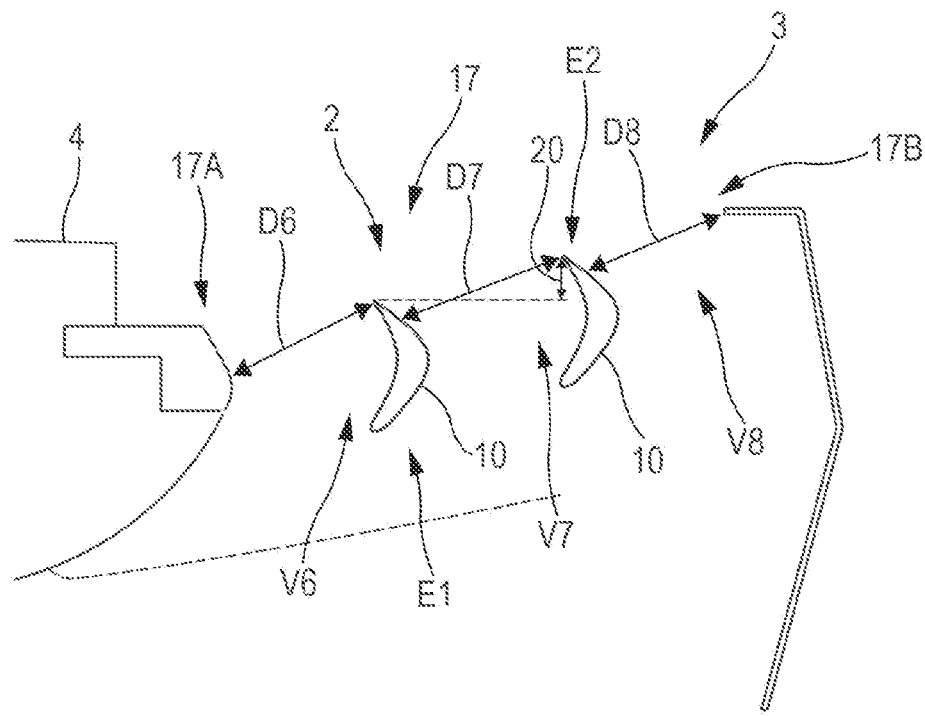
FIG. 9 is a schematic view in longitudinal section of part of a nacelle, in the region of an ejection structure, according to an exemplary embodiment.

Referring to FIG. 9, the ejection structure 2 comprises two orbital deflectors 10. These orbital deflectors 10 are arranged one behind the other, from upstream to downstream, in such a way as to create ejection paths V6, V7 and V8. These ejection paths V6, V7 and V8 have longitudinal distances D6, D7 and D8 at the outlet end E2 of the ejection structure 2, namely:

the distance D6 between the upstream end 17A of the ejection zone 17 and the furthest upstream orbital deflector 10;

the distance D7 between the two orbital deflectors 10; and the distance D8 between the furthest downstream orbital deflector 10 and the downstream end 17B of the ejection zone 17.

The distances D6, D7 and D8 are different in this embodiment and are selected in such a way as to optimize the ejection of the flow through the ejection paths V6, V7 and V8 and obtain the desired properties for the thrust reverser 3, particularly as regards ejection. In an embodiment variant, it is also conceivable for some of the distances D6, D7 and D8 or for all of the distances D6, D7 and D8 to be equal.

In addition, in this exemplary embodiment, unlike in the first and second embodiments described hereinabove, the orbital deflectors 10 are not aligned. Specifically, the two orbital deflectors 10, of identical embodiment, are offset radially relative to one another. More specifically, the orbital deflector 10 furthest downstream is offset radially toward the outside by a radial distance 20 relative to the orbital deflector 10 furthest upstream. This radial offset in particular makes it possible to contribute to obtaining particular flow characteristics desired for the ejection structure 2.

Figure 10:
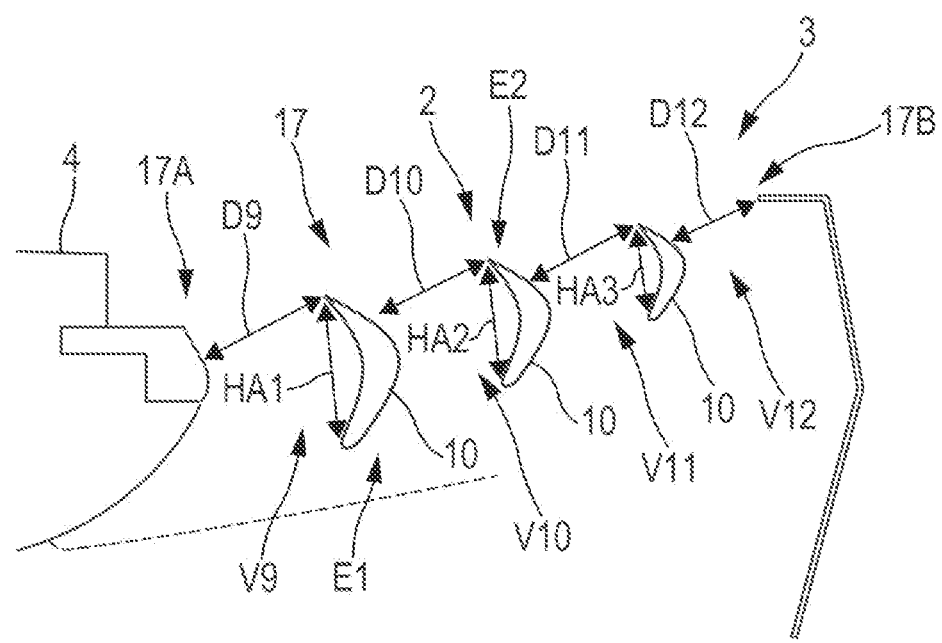
FIG. 10 is a schematic view in longitudinal section of part of a nacelle, in the region of an ejection structure, according to an exemplary embodiment.

Referring to FIG. 10, the ejection structure 2 comprises three orbital deflectors 10. These orbital deflectors 10 are arranged one behind another, from upstream to downstream, so as to create ejection paths V9, V10, V11 and V12. These ejection paths V9, V10, V11 and V12 have longitudinal distances D9, D10, D11 and D12 at the outlet end E2 of the ejection structure 2, namely:

the distance D9 between the upstream end 17A of the ejection zone 17 and the furthest upstream orbital deflector 10;

the distance D10 between the two furthest upstream orbital deflectors 10;

the distance D11 between the two furthest downstream orbital deflectors 10; and the distance D12 between the furthest downstream orbital deflector 10 and the downstream end 17B of the ejection zone 17.

The distances D9, D10, D11 and D12 are different in this embodiment and are chosen in such a way as to optimize the ejection of the flow through the ejection paths V10, V11 and V12 and obtain the desired properties for the thrust reverser 3 particularly as regards ejection. In an embodiment variant, it is also conceivable for some of the distances D9, D10, D11 and D12 or all of the distances D9, D10, D11 and D12 to be equal.

In this exemplary embodiment, the orbital deflectors 10 are not aligned. Specifically, the orbital deflectors 10 are offset radially relative to one another. More specifically, from upstream to downstream, the successive orbital deflectors 10 are offset radially toward the outside. This radial offset makes it possible in particular to contribute to obtaining particular flow characteristics desired for the ejection structure 2.

In addition, in this exemplary embodiment, unlike in the first, second and third embodiments described hereinabove, the orbital deflectors 10 are not identical. Specifically, the three orbital deflectors 10 have respective heights HA1, HA2, and HA3 which are different. In an embodiment variant, the orbital deflectors 10 may equally have other differences from one another, this being in addition to or in the place of the difference in height. These differences may, for example, relate to the geometry of the upstream and/or downstream faces of the deflector plates of the orbital deflectors. The differences between the orbital deflectors 10 in particular make it possible to contribute to obtaining particular flow characteristics desired for the ejection structure 2.

Figure 11:
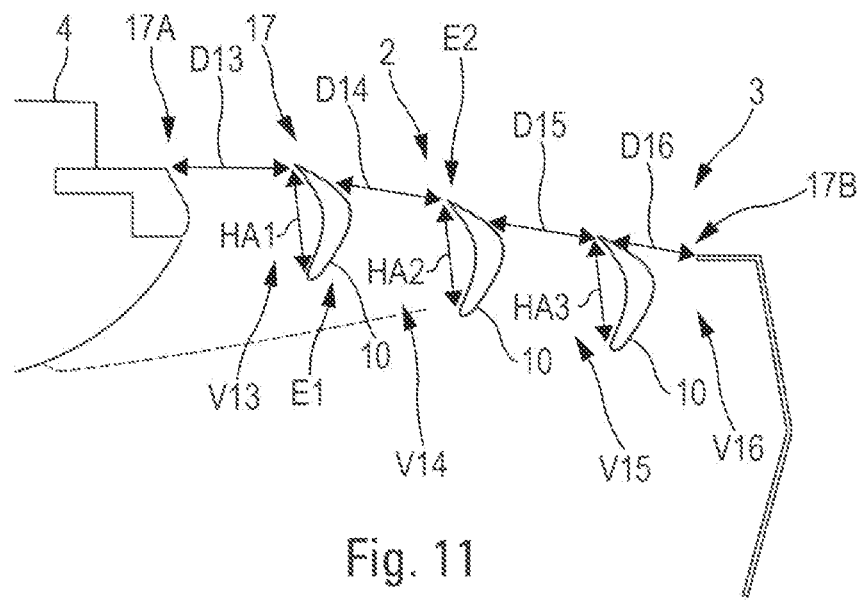
FIG. 11 is a schematic view in longitudinal section of part of a nacelle, in the region of an ejection structure, according to an exemplary embodiment.

Referring to FIG. 11, the ejection structure 2 comprises three identical orbital deflectors 10 (of height HA). In a variant, they may equally, at least in terms of some of them, be different. These orbital deflectors 10 are arranged one behind the other, from upstream to downstream, so as to create ejection paths V13, V14, V15 and V16. These ejection paths V13, V14, V15 and V16 have longitudinal distances D13, D14, D15 and D16 at the outlet end E2 of the ejection structure 2, namely:

- the distance D13 between the upstream end 17A of the ejection zone 17 and the furthest upstream orbital deflector 10;
- the distance D14 between the two furthest upstream orbital deflectors 10;
- the distance D15 between the two furthest downstream orbital deflectors 10; and
- the distance D16 between the furthest downstream orbital deflector 10 and the downstream end 17B of the ejection zone 17.

The distances D13, D14, D15 and D16 are different in this embodiment and are selected in such a way as to optimize the ejection of the flow through the ejection paths V13, V14, V15 and V16 and obtain the desired properties for the thrust reverser 3 particularly as regards ejection. In an embodiment variant, it is also conceivable for some of the distances D13, D14, D15 and D16 or all of the distances D13, D14, D15 and D16 to be equal.

In this exemplary embodiment, the orbital deflectors 10 are not aligned. Specifically, the orbital deflectors 10 are offset radially from one another. More specifically, from upstream to downstream, the successive orbital deflectors 10 are offset radially toward the inside, and therefore in the opposite direction from in the embodiment of FIG. 10. This radial offset makes it possible in particular to contribute to obtaining particular flow characteristics desired for the ejection structure 2.

Figure 12:
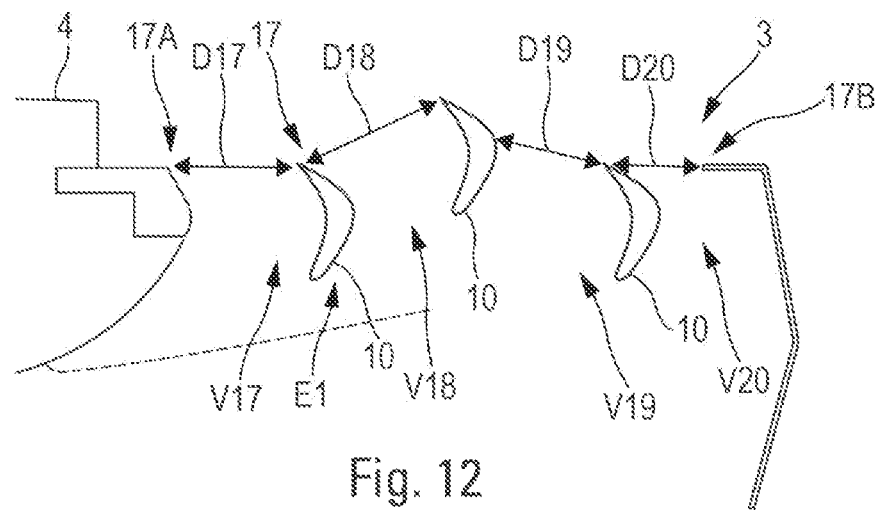
FIG. 12 is a schematic view in longitudinal section of part of a nacelle, in the region of an ejection structure, according to an exemplary embodiment.
Figure 13:
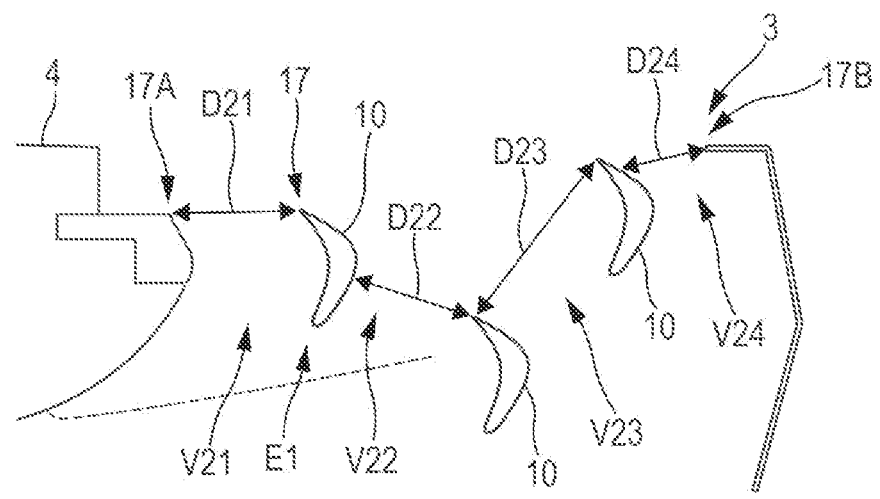
FIG. 13 is a schematic view in longitudinal section of part of a nacelle, in the region of an ejection structure, according to an exemplary embodiment.

Referring to FIGS. 12 and 13, other examples of radial offsets of the orbital deflectors 10 relative to one another are illustrated. These radial offsets make it possible to contribute to obtaining particular flow characteristics desired for the ejection structure 2.

The orbital deflectors 10 are identical. Referring to FIG. 12, the orbital deflectors 10 are arranged one behind the other, from upstream to downstream, so as to create ejection paths V17, V18, V19 and V20. These ejection paths V17, V18, V19 and V20 have longitudinal distances D17, D18, D19 and D20 at the outlet end E2 of the ejection structure 2, namely:

- the distance D17 between the upstream end 17A of the ejection zone 17 and the furthest upstream orbital deflector 10;
- the distance D18 between the two furthest upstream orbital deflectors 10;
- the distance D19 between the two furthest downstream orbital deflectors 10; and
- the distance D20 between the furthest downstream orbital deflector 10 and the downstream end 17B of the ejection zone 17.

The distances D17, D18, D19 and D20 are different in this embodiment and selected in such a way as to optimize the ejection of the flow through the ejection paths V17, V18, V19 and V20 and obtain the desired properties for the thrust reverser 3 particularly as regards ejection. In an embodiment variant, it is also conceivable for some of the distances D17, D18, D19 and D20 or all of the distances D17, D18, D19 and D20 to be equal.

In this exemplary embodiment, the orbital deflectors 10 are not all aligned. Specifically, some of the orbital deflectors 10 are offset radially relative to one another. More specifically, the two end orbital deflectors 10 (namely the furthest upstream orbital deflector 10 and the furthest downstream orbital deflector 10) are arranged radially at the same level, while the central orbital deflector 10 is offset radially outward relative to these two end orbital deflectors 10.

Referring to FIG. 13, the orbital deflectors 10 are arranged one behind the other, from upstream to downstream, in such a way as to create ejection paths V21, V22, V23 and V24. These ejection paths V21, V22, V23 and V24 have longitudinal distances D21, D22, D23 and D24 at the outlet end E2 of the ejection structure 2, namely:

- the distance D21 between the upstream end 17A of the ejection zone 17 and the furthest upstream orbital deflector 10;
- the distance D22 between the two furthest upstream orbital deflectors 10;
- the distance D23 between the two furthest downstream orbital deflectors 10; and
- the distance D24 between the furthest downstream orbital deflector 10 and the downstream end 17B of the ejection zone 17.

The distances D21, D22, D23 and D24 are different in this embodiment and selected in such a way as to optimize the ejection of the flow through the ejection paths V21, V22, V23 and V24 and obtain the desired properties for the thrust reverser 3 particularly as regards ejection. In an embodiment variant, it is equally conceivable for some of the distances D21, D22, D23 and D24 or all the distances D21, D22, D23 and D24 to be equal.

In this exemplary embodiment, the orbital deflectors 10 are not aligned. Specifically, some of the orbital deflectors 10 are offset radially relative to one another. More specifically, the central orbital deflector 10 is offset radially further toward the inside relative to the other two orbital deflectors 10, and the furthest downstream orbital deflector 10 is offset radially further toward the outside relative to the other two orbital deflectors 10.

The setting of the distances D1 to D24 is therefore an important parameter in optimizing the performance of the ejection structure 2 and thus of the thrust reverser 3. In particular, because the flow G1 (FIG. 1) arriving at the thrust reverser 3 is not uniform, it is possible in particular to adapt the separation of the orbital deflectors 10 in order to optimize the flow H (passing through the ejection structure 2) which generates reverse thrust.

In the context of the present invention, controlling the flow H through the ejection structure 2 so as to optimize the ejection structure 2 is achieved notably by adapting the ejection paths V1 to V24, and doing so along the entire length thereof from the inlet end E1 to the outlet end E2, particularly by adapting the (longitudinal and radial) positioning and the characteristics of the orbital deflectors 10 and, as appropriate, of the lateral deflectors 11.

Referring to FIGS. 7 to 13, the orbital deflectors 10 are schematically depicted take the form of the deflector 1A of FIG. 3. The orbital deflectors 10 may equally correspond to the deflector 1B of FIG. 5. Thus, thanks to the use of orbital deflectors 10 corresponding to the deflectors 1A, 1B according to one of the embodiments of the invention, it is possible to replace the usual ejection cascades having cascades of vanes comprising a high number of usual orbital deflectors with the ejection structure 2 comprising a reduced number of orbital deflectors 10, for example 1 to 6 orbital deflectors 10. The orbital deflectors 10 are intended to perform the same aerodynamic function as the usual cascades of ejection vanes in order to provide the necessary reverse-thrust force.

The number and shape of these orbital deflectors 10 make it possible to meet criteria regarding flow rate performance (sufficient flow rate to avoid problems with the operation of the fan) and in terms of effectiveness (reverse-thrust force). The orbital deflectors 10 may therefore be produced in such a way as to achieve the desired performance, particularly adapted according to need.

In particular, because the flow G1 (FIG. 1) arriving at the thrust reverser 3 is not uniform, the number, separation and characteristics of the orbital deflector or deflectors 10 are adapted to suit this flow G so as to optimize the flow H that passes through the ejection structure 2 and therefore increase the reverse-thrust generated.

The foregoing embodiments relating to FIGS. 7 to 13 relate to the orbital deflectors 10 of the ejection structure 2. As indicated hereinabove, in one particular embodiment, the ejection structure 2 may equally comprise deflectors 1A, 1B as lateral deflectors 11.

The lateral deflectors 11, of which may be fewer than 50, may be produced in the same way as the orbital deflectors 10. The lateral deflectors 11 are intended to distribute the air flow at multiple angles around the thrust reverser 3. These deflections are particularly aimed at avoiding discharging toward the ground, avoiding the flow being reingested by the air inlet, which could damage the engine, and avoiding interactions with the anemometry equipment.

Whatever the embodiment envisioned, the number of lateral deflectors 11 is dependent in particular on the desired performance objective. An exemplary embodiment may comprise several orbital deflectors 10, as in the embodiments of FIGS. 7 and 9 to 13, the lateral deflectors 11 are positioned between the orbital deflectors 10, as in the example of FIG. 2.

Furthermore, in an exemplary embodiment with just one orbital deflector 10, as in the embodiment of FIG. 8, the lateral deflectors 11 are attached internally to the orbital deflector 10.

Therefore, there is no need to provide a support frame surrounding the ejection structure 2 in order to hold the deflectors in place, as there is in the case of a conventional ejection cascade.

As a result, in the context of the present invention, great flexibility is achieved in producing the ejection structure 2. Specifically, it is possible in particular to vary one, several or all of the following parameters of the orbital deflectors 10 and/or the lateral deflectors 11 in order to obtain the desired properties for the ejection structure 2:
  their number;
  their individual characteristics and, in particular:
    their height;
    the value of their inlet and/or outlet angles;
    the shape of the curvature of their intermediate zone;
    the width of the end surface 22 in the case of the deflector 1B;
  their location within the ejection structure, which is to say both their longitudinal position (along the axis X) and their radial position (along the axis Z) in the ejection structure, particularly so as to define the characteristics of the ejection paths; and
  a variation in their aforementioned individual characteristics according to their location in the ejection structure.

The foregoing variable parameters have a significant impact on the performance of the thrust reverser 3 and can therefore be selected in order to produce an ejection structure 2 and a thrust reverser 3 that are suited to the engine and to the nacelle into which they are incorporated in such a way as to obtain the desired properties and performance.

In particular, the control of the flow H through the ejection structure 2 may be achieved by adapting the ejection paths V1 to V24, and this is obtained by adapting the (longitudinal and radial) positioning and individual characteristics of the orbital deflectors 10 and, as applicable, of the lateral deflectors 11.

The deflectors 1A, 1B and/or the ejection structures 2 and/or the thrust reversers 3, all as described hereinabove, thus offer numerous advantages. First of all, the particular overall geometric profile of the deflector 1A, 1B makes it possible to generate a specific aerodynamic effect and thus modify the topology of flow at the outlet sections of the thrust reverser 3. In particular, it is possible to generate an angular effect that makes it possible to increase the reverse-thrust effect. Above all, it is possible to form ejection paths V1 to V24 that make it possible to act effectively on the flow in order to obtain the desired ejection characteristics, particularly in terms of performance.

It is thus possible to replace the usual ejection cascades with cascades of vanes (comprising a high number of usual orbital deflectors) with the ejection structure 2 comprising a reduced number of orbital deflectors 10, for example 1 to 6 orbital deflectors 10. The orbital deflectors 10 are intended to perform the same aerodynamic function as the usual ejection vane cascades, namely provide the desired reverse-thrust force.

A reduction in bulk and mass is also obtained with the ejection structure 2 compared with a usual cascade-type thrust reverser with ejection vanes. In addition, unlike a usual ejection cascade, there is no need to provide a support frame surrounding the ejection structure 2 in order to hold the deflectors in place, and this likewise contributes to reducing bulk and mass.

The number and shape of the orbital deflectors 10 make it possible to meet criteria regarding flow rate performance (flow rate high enough to avoid problems with the operation of the engine fan) and regarding effectiveness (reverse-thrust force). The orbital deflectors 10 may be produced in such a way as to obtain the desired performance, adapted particularly according to the requirement.

The obtained increase in effectiveness makes it possible greatly to reduce the travel of the thrust reverser 3 and particularly of the mobile cowl 6, a 40% reduction in opening being conceivable for certain embodiments, something which offers a significant advantage, particularly in terms of the kinematics, the length of the actuators, the chain of dimensions, the mass, etc.

Moreover, the deflectors and more generally the ejection structure may be produced in different materials, for example in metal, in composite or in a bimaterial. In addition, the various possible embodiments make it possible to implement different manufacturing methods, for example a usual method for the manufacture of a composite component or 3D metallic printing, and it is possible in each instance to use the method that is the most suitable, for example in terms of simplicity, speed and/or cost of manufacture.

Furthermore, thanks to the various characteristics that can be obtained for the deflectors 1A, 1B, it is also possible to adapt both the orbital deflectors 10 and the lateral deflectors 11 in such a way as to generate controlled flow over the entire perimeter of the engine, this flow being, for example, tailored to a desired flow map that is dependent in particular on characteristics of the engine and aerodynamic constraints of the aircraft.

Furthermore, the following parameters make it possible to optimize the operation of the orbital deflectors:

the spacing between the orbital deflectors;
the size of the orbital deflectors;
the staging (or radial arrangement) of the orbital deflectors;
the geometry of the orbital deflectors, which may differ between orbital deflectors of the one same thrust reverser.

Any combination of these parameters may be implemented in an engine, depending on the characteristics of the engine on which these orbital deflectors are mounted.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A deflector for a thrust reverser of a nacelle of an aircraft engine, the deflector comprising:
a deflector plate configured act on an aerodynamic flow, the deflector plate having as upstream face, a downstream face, an inlet end, and an outlet end,
wherein the upstream face and the downstream face of the deflector plate have different curved profiles with, between the inlet end and the outlet end, wherein the deflector plate includes a thickness less than 40% of a height of the deflector, three successive zones:
an inlet zone corresponding to a portion that is rectilinear, in cross section, both on the upstream face and on the downstream face;
an intermediate zone corresponding, in cross section, to a portion that is curved both on the upstream face and on the downstream face, the curved portions having different curvatures between the upstream face and the downstream face; and
an outlet zone corresponding to a portion that is rectilinear, in cross section, both on the upstream face and on the downstream face.

2. The deflector as claimed in claim 1, wherein the deflector plate includes a body having a hollow closed internal space thereon.

3. The deflector as claimed claim 1, wherein the deflector plate comprises at least one of the following angle values:
for the upstream face, at the inlet end, an inlet angle of between 5° and 70°;
for the downstream face, at the inlet end, an inlet angle of between 5° and 70°;
for the upstream face, at the outlet end, an outlet angle of between 10° and 60°;
for the downstream face, at the outlet end, an outlet angle of between 10° and 60°.

4. The deflector as claimed in claim 1, wherein the upstream face and the downstream face of the deflector plate meet along a junction line at the outlet end.

5. The deflector as claimed in claim 1, wherein the upstream face and the downstream face of the deflector plate meet on each side an end surface at the outlet end.

6. The deflector as claimed in claim 5, wherein the end surface is planar.

7. The deflector as claimed in claim 1, wherein the deflector is an orbital deflector or a lateral deflector.

8. A thrust reverser for a nacelle of an aircraft engine, wherein the thrust reverser comprises at least one deflector as claimed claim 1.

9. The thrust reverser as claimed in claim 8, wherein the at least one deflector is arranged in such a way as to create ejection paths of variable widths.

10. The thrust reverser as claimed in claim 8, wherein the thrust reverser further comprises a plurality of deflectors having characteristics that vary according to their location.

11. The thrust reverser as claimed in claim 8, wherein the thrust reverser further comprises a plurality of deflectors of which at least two of the plurality of deflectors are radially offset relative to one another.

12. A nacelle for an aircraft engine, wherein the nacelle comprises at least one thrust reverser as claimed claim 8.

13. The deflector as claimed in claim 1, wherein the upstream face is concave.

14. The deflector as claimed in claim 1, wherein the downstream face is convex.

15. A thrust reverser for a nacelle of an aircraft engine, comprising:
a plurality of deflectors of which at least two of the plurality of deflectors are radially offset relative to one another, at least one of the plurality of deflectors comprising:
a deflector plate configured act on an aerodynamic flow, the deflector plate having as upstream face, a downstream face, an inlet end, and an outlet end,
wherein the upstream face and the downstream face of the deflector plate have different curved profiles with, between the inlet end and the outlet end, three successive zones:
an inlet zone corresponding to a portion that is rectilinear, in cross section, both on the upstream face and on the downstream face;
an intermediate zone corresponding, in cross section, to a portion that is curved both on the upstream face and on the downstream face, the curved portions having different curvatures between the upstream face and the downstream face; and
an outlet zone corresponding to a portion that is rectilinear, in cross section, both on the upstream face and on the downstream face.

* * * * *